March 16, 1965
M. ARDITI
3,174,114
ATOMIC CLOCK
Filed May 1, 1959
2 Sheets-Sheet 1
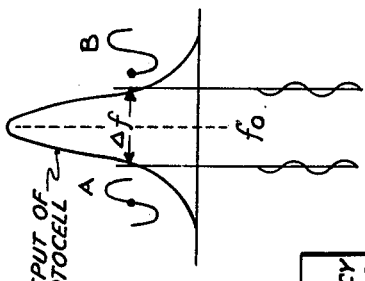
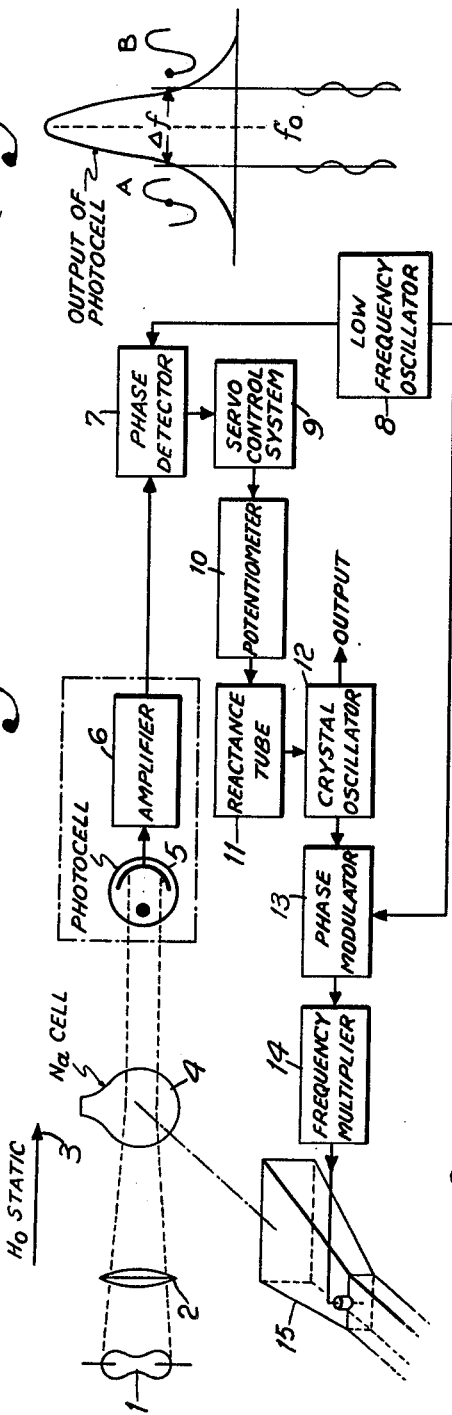
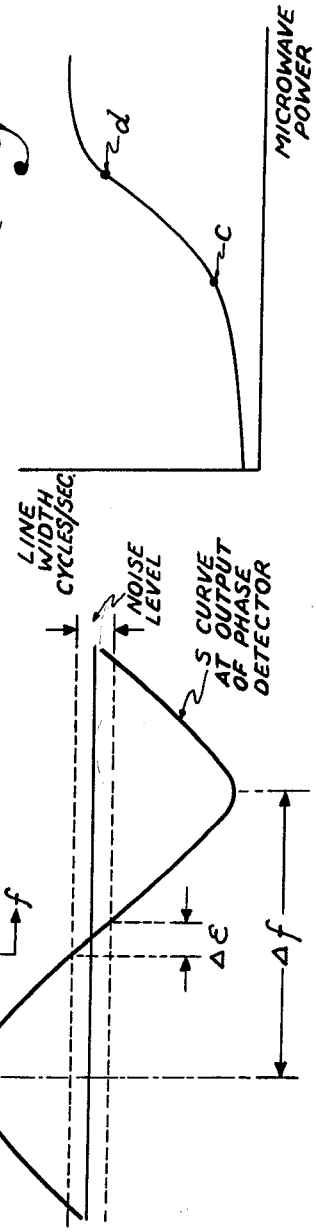
INVENTOR.
MAURICE ARDITI
BY Philip M. Bolton
ATTORNEY

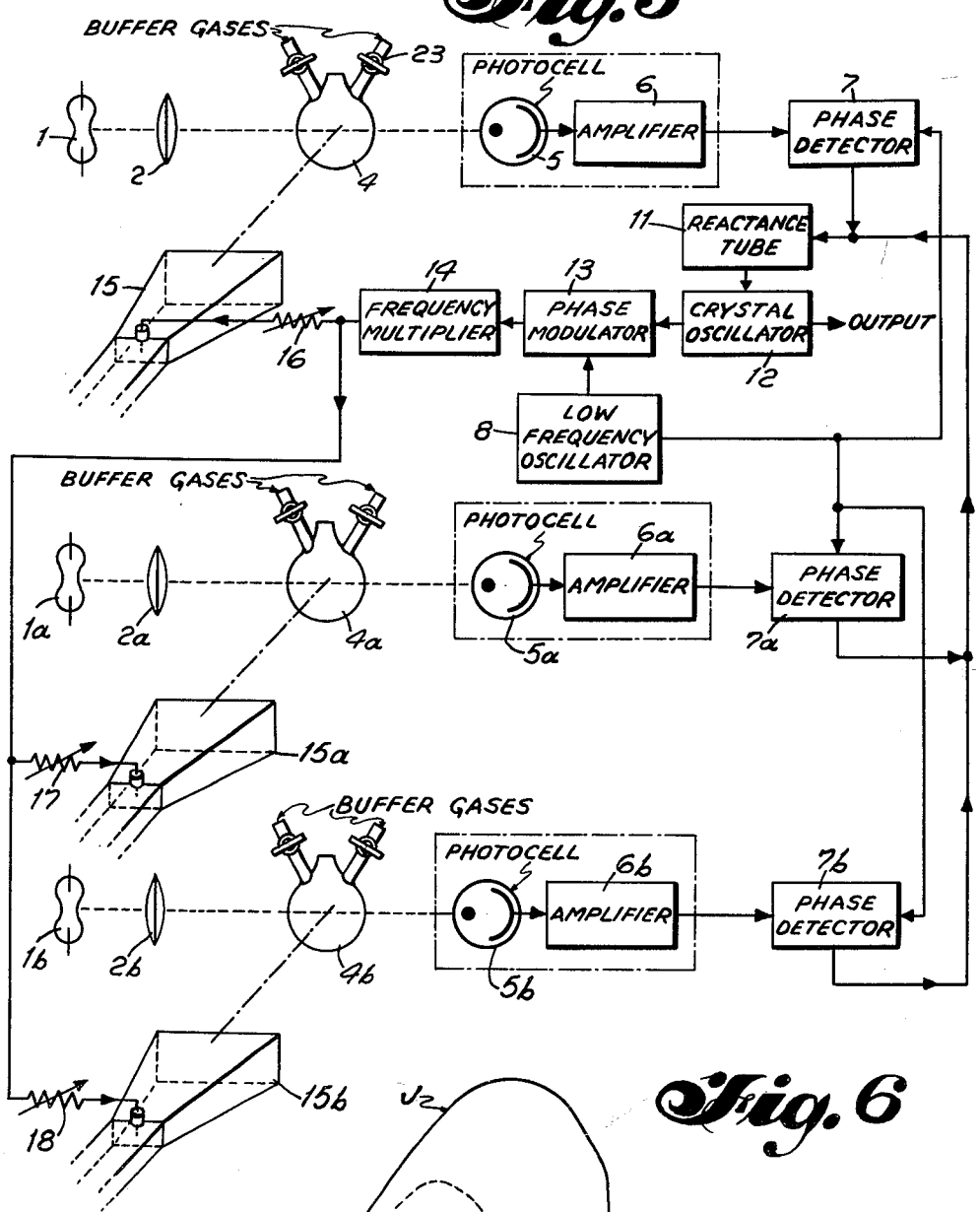
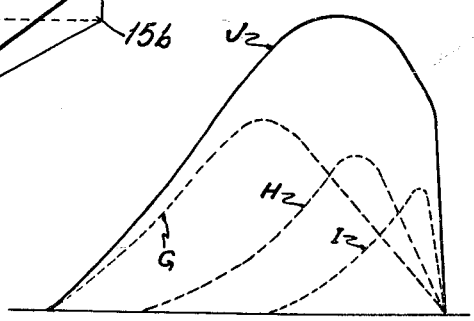

United States Patent Office 3,174,114
Patented Mar. 16, 1965

3,174,114
ATOMIC CLOCK
Maurice Arditi, Clifton, N.J., assignor to International
Telephone and Telegraph Corporation, Nutley, N.J.,
a corporation of Maryland
Filed May 1, 1959, Ser. No. 810,370
13 Claims. (Cl. 331—3)

This invention relates to frequency selective systems, particularly of the type using detection of microwave hyperfine transitions in a gas cell filled with an alkali vapor, and its application, for example, to an atomic frequency standard.

Techniques are now well known for deriving a frequency standard from a stabilized oscillator under control of atomic transitions in a confined gas. Devices for providing such frequency standards are known as "Atomic Clocks."

The gas cell atomic clock utilizes a cell filled with an alkali metal vapor, this cell being irradiated with microwave energy. Such cells are sensitive to the frequency of the irradiating microwave energy, and the transmission of microwave energy through the cell (or absorption thereof, depending upon the state of the cell) will be a maximum at a given frequency, the atomic resonance frequency, and will decrease on either side of the atomic resonance frequency according to a characteristic resonance curve. Not only does the frequency of the microwave energy affect the transmission (or absorption) of the microwave energy, but it also affects the light transmission characteristics of the cell so that if a light is directed through the cell and received at a given point, the intensity of light reaching the given point will vary according to a similar resonance curve as the frequency of the irradiating microwave energy frequency deviates from the atomic resonance frequency. The atomic clock makes use of the resonance curve characteristic of such a cell for controlling a stabilized oscillator (usually a crystal oscillator) which, in turn, determines the frequency of the irradiating microwave energy. This control is accomplished by, in effect, frequency modulating the microwave energy by low frequency oscillations about the resonance frequency. Thus, light directed through the gas cell and picked up by a photocell provides a signal which varies in sense and magnitude as the microwave energy shifts to one or the other side of the resonance frequency within the resonance curve. This signal is applied to a phase comparator where the phase of the photocell signal is compared with that of the low frequency oscillations. The phase comparator develops an error signal proportional to the frequency difference between the resonance frequency and the frequency of the microwave energy, which error signal is applied to a frequency control circuit for adjusting the oscillator so that the frequency of the microwave energy is locked to the resonance frequency.

For accuracy and stability, gas cell atomic clocks must meet at least three essential requirements. The first requirement is that the center or resonance frequency of the gas cell should be substantially independent of variations in external factors, such as electric or magnetic fileds, temperature, pressure, etc. The second requirement is that the width of the resonance curve or line, i.e., the bandwidth, should be as narrow as possible. The third requirement is that the signal-to-noise ratio of the detected signal should be as large as possible. Atomic clocks have been described which are directed towards improvements in the first and third requirements. Reference is hereby also made to U.S. copending applications Serial No. 701,929, filed December 10, 1957, for "Frequency Selective Method and System" (M. Arditi et al., 55–1), of which the present application is a continuation in part, now abandoned, and Serial No. 716,686, filed February 21, 1958, for "Gas Cell for Frequency Selective System" (M. Arditi, 58), now U.S. Patent No. 2,955,262, granted October 4, 1960.

In the first-mentioned application (now abandoned), it was pointed out that the signal-to-noise ratio could be enhanced by the use of so-called "optical pumping" and "optical detection," and the present invention is directed to an atomic clock using these optical techniques. This invention is also directed to a practical fulfillment of the second requirement.

It has been learned that the bandwidth ($\Delta f$) of the atomic resonance curve is affected by several factors, such as the amount of frequency deviation produced by the modulation, the pressure of a buffer gas in the gas cell or the amount of microwave power irradiating the gas cell. By using a small frequency deviation, moderately high gas pressure, and microwave power below saturation, a very narrow resonance line, or bandwidth, can be obtained. It is possible, for example, by utilizing only the most precise equipment and adjusting gas pressures and temperatures to exact values to obtain a resonance line as narrow as 10 cycles at 1771 mc. for sodium or a 9192 mc. for cesium.

At first glance, it would seem that by using such a cell of very narrow resonance line, an extremely accurate atomic clock would be obtained. However, using very narrow lines to lock an oscillator creates a problem because the frequency determined by the oscillator must be within the effective bandwidth or "pulling range" of the resonance line in order to obtain a usable error signal; i.e., a signal large enough compared to the noise, and sufficient to drive the frequency control circuit. If the line width is 10 cycles at 1771 mc., the oscillator-determined frequency must be accurate to within 2 parts in 100 million. If this is realized, then an accuracy of 2 parts in one billion to 2 parts in ten billion can be obtained by locking the oscillator to the atomic transition. However, as a practical matter, it is extremely difficult to obtain oscillators having such a degree of accuracy and when the frequency of the microwave energy controlled by such oscillators is, initially or because of drift, outside the pulling range or effective bandwidth of such a narrow resonance curve, control is lost. Because of this, the use of such extremely narrow bandwidth cells with attendant high accuracy has not been too easy.

An object of the present invention is the provision of a frequency stable system or atomic clock using a gas cell in which the signal is optically detected.

Another object of this invention is to provide an atomic clock taking advantage of a narrow bandwidth cell to obtain high accuracy, with an oscillator whose initial accuracy is relatively so low that the frequency of the microwave energy determined by said oscillator could fall outside the effective bandwidth of such a cell. For example, an atomic clock having an accuracy of 1 part in one billion to 1 part in ten billion may be used with a crystal oscillator having an initial accuracy of only 1 part in ten million.

According to a main feature of the invention, there is provided an atomic clock utilizing a plurality of gas cells having the same resonance or center frequency but whose resonance curves have progressively wider bandwidths. The bandwidth of the cell having the widest effective bandwidth is sufficiently wide to encompass the range of frequencies of the microwave energy determined by the usual drift of the oscillator. The narrowest bandwidth cell has a narrower bandwidth, for example, as described above, which is, of course, less than that of the expected drift range of the frequencies determined by the oscillator. Together these cells are arranged so as to pull the oscillator-determined frequencies within the effective bandwidth of the narrowest bandwidth cell, so that the narrowest bandwidth cell cooperates with the others in producing an extremely accurate control of said frequencies.

In accordance with another feature of the invention, the different bandwidths of such gas cells may be variably controlled or may be initially preset.

In accordance with one aspect of the above feature, the control of the bandwidth of the different cells, particularly the broadening of the bandwidth of a predetermined cell or cells, is accomplished by irradiating the cells with successively different levels of microwave power.

In accordance with another aspect of the last-mentioned feature, the bandwidth of the cells is controlled, or initially adjusted, by controlling the pressure of the buffer gases in said cells. In acordance with this aspect of the present invention, a mixture of selected buffer gases is employed, as set forth in by above-mentioned copending application, Arditi (58), Serial No. 716,686, which mixture is such that, despite changes in the pressure, the center or resonance frequency remains constant, and only the bandwidth is changed.

Other and further objects, advantages, and features of the present invention will become apparent, and the foregoing will be better understood with respect to the following description of a specific embodiment thereof, reference being had to the drawings, in which:

FIG. 1 is a block and schematic diagram of a conventional atomic clock;

FIG. 2 is an atomic resonance curve of a gas cell, showing the effects of the low frequency modulations and the resultant detected signals;

FIG. 3 is an S curve showing the relationship of the frequency to the output of the phase discriminator used in controlling the crystal oscillator;

FIG. 4 is a curve showing the relationship between line width and microwave power;

FIG. 5 is a block diagram of the novel atomic clock; and

FIG. 6 is a set of curves used in describing the operation of the system of FIG. 5, particularly the arrangement of gas cells.

Referring first to the known arrangement of FIG. 1, a beam of natural resonance light from a standard alkali metal lamp 1 is directed by a lens system 2 through a gas cell 4 containing heated vaporized alkali metal and one or more buffer gases. The alkali metal for the lamp and the gas should be the same. Sodium, cesium, and rubidium have been favored for such gas cells, although the other alkali metals may also be employed. Lamp 1, for example, could be a cesium or a sodium lamp and the gas cell correspondingly would contain cesium or sodium vapor. A non-magnetic buffer gas or mixture of buffer gases is employed to increase the diffusion time of the alkali atoms to the walls of the cell and produce a reduction in the Doppler effect with a corresponding increase in the sharpness of the resonant frequency line. Amongst the buffer gases are the rare inert gases, hydrogen, helium, neon, nitrogen, argon, krypton, and xenon. By a proper combination of buffer gases, the resonance frequency may be made relatively independent of pressure, as pointed out more fully in my above-mentioned copending application (Arditi 58) Serial No. 716,686.

A static magnetic field 3 is provided whose magnetic lines of force are parallel to the direction of propagation of the light beam and parallel to the magnetic field of the microwave energy which is used to radiate the cell 4, as is pointed out hereinafter. Any suitable source for producing such a magnetic field may be employed. It is advisable also to magnetically shield the gas cell from outside field interferences.

The light passing through cell 4 is directed onto a photocell 5 whose output is amplified at 6; the corresponding amplified output being applied to a phase comparator 7, which may be in the form of a synchronous detector.

In the phase comparator 7, the output of amplifier 6 is compared with a reference signal from a low frequency oscillator 8. The output of the phase comparator, whose amplitude and polarity vary in accordance with the difference between the center frequency of the atomic resonance and the frequency of the microwave energy applied to the cell, as will be pointed out below, is applied to a servo control system 9. The servo control system drives a potentiometer 10 which produces an error voltage applied to a reactance tube 11. The reactance tube produces relatively small changes in the frequency of a crystal oscillator 12. The output of crystal oscillator 12 is phase modulated in a phase modulator 13 by a signal from the low frequency oscillator 8. The resultant phase modulated signal is applied to frequency multiplier microwave energy generator 14, where it is multiplied to the resonance frequency. The resultant frequency modulated microwave signal is then applied to a microwave horn 15 or resonant cavity via suitable waveguiding means, such as a coaxial line and a radiating probe. The horn radiates the resultant microwave energy through the cell 4. The horn 15 is so oriented that the resultant magnetic field of the radiated wave, as it passes through the sodium cell 4, is parallel to the static magnetic field 3.

In operation, the cell 4 is preferably heated to a temperature preferably between 120° C. to 130° C. for sodium. The operating temperatures for whatever alkali vapors are employed should be high enough to allow enough atoms to be excited to obtain a good signal output, but not so high as to produce disorientation of the magnetic moments due to collisions between atoms.

It will be recognized by those conversant with this field that the resonance light from the lamp 1 not only serves as a medium enabling the detection of the atomic transitions within the gas cell, but also serves as a means of exciting the atoms within the cell so as to produce population differences between different energy levels, therefore producing larger signal outputs when the induced transitions occur between said energy levels. This effect is commonly referred to as "optical pumping." For further details thereof, reference is made to the literature in this field and to the above-mentioned copending applications.

Preferably, because of conflict in the requirements for optimum optical pumping efficiency and for a reduction in the Doppler effect, a buffer gas pressure of between 1 mm. and 5 mm. of Hg pressure is used. However, in case very sharp resonant transitions are desired, higher pressures may be employed. For example, pressures of buffer gases as high as 3 cm. of Hg may be used.

The low frequency oscillator 8 is employed to vary the frequency of the microwave energy back and forth, over a small portion of the resonance frequency curve, as illustrated in FIG. 2.

FIG. 2 illustrates a Lorentzian resonance curve showing the resonant line $f_0$ and the bandwidth $\Delta f$ which occurs at the half power point. The curve of FIG. 2 shows how the output of the photocell 5 varies as the microwave energy irradiating gas cell 4 varies in frequency. The oscillations of the low frequency oscillator are shown as occurring on either side of the resonant line $f_0$, and the corresponding outputs are shown as waveforms A and B. As the microwave frequency applied to the gas cell is varied on either side of the resonant line $f_0$, the light absorption varies according to a characteristic low frequency sine wave of the same frequency as the modulator frequency. If the mean frequency of the crystal oscillator is equal to the resonant line $f_0$, the output from the photocell is a minimum. If the mean frequency is on either side of $f_0$, an output will be obtained from photocell 5 in the form of a low frequency wave. When the mean frequency is on one side of $f_0$, the phase of this low frequency wave will be 180° out of phase with the low frequency wave produced when the mean frequency is on the other side of $f_0$.

In the phase comparator 7, this low frequency wave is compared with the reference low frequency wave from oscillator 8. FIG. 3 illustrates an error curve or S curve representing the resulting error voltage which appears at the output of the phase detector 7. This error voltage is fed back, in proper phase, to the frequency control circuit 9, 10 and 11, whereby the crystal oscillator is locked to the center or atomic resonance frequency $f_0$. However, because of the inherent noise in the system, there is an area of uncertainty in the resulting frequency around $f_0$. This frequency error is shown as $\Delta \epsilon$ in FIG. 3. It is apparent that $\Delta \epsilon$ depends on the slope of the detector curve which depends on the bandwith $\Delta f$ of the atomic resonance curve. A small error $\Delta \epsilon$ is obtained if $\Delta f$ is small and the signal-to-noise ratio is good. Thus, the advantage of using the narrowest bandwidth feasible becomes apparent. However, as has been pointed out hereinbefore, the use of such a narrow bandwidth presents the problem that the oscillator drift may place the frequency of the microwave energy outside the "pulling range" of such a narrow bandwidth cell.

To take advantage of the characteristics of a narrow bandwidth cell, it is proposed in accordance with this invention to use a number of cells whose resonance curves are of different bandwidths. One way of controlling bandwidth is by controlling the microwave power applied to the cell.

In accordance with the invention, use is made of gas cells whose resonance curves are of different bandwidths. The relationship between the line width and the microwave power is shown in FIG. 4. The illustration is only qualitative in character and serves to show that over a given range of microwave power the line width is not materially affected, but as the microwave power is increased, the line width widens. For example, between the regions $c$ and $d$, the line width of the resonance curve may be adjusted to a desired breadth.

It is to be noted that while the use of power saturation for broadening the bandwidth of a gas cell has certain advantages in terms of ready control and flexibility, the achievement of different bandwidths in different gas cells may be obtained by varying the pressure of the gases, the mixtures employed, the volume of the cells, etc.

In the system of FIG. 5 there is illustrated a means for controlling the bandwidth of the different cells by controlling the amount of power saturation of the cells, and there is also shown another method of controlling the bandwidth of the cells by controlling the pressure of the buffer gases therein. With this latter technique, however, one must avoid shifting of the center or resonance frequency of the cell with change in pressure. By using the proper mixtures and percentages of buffer gases, the effect of increasing pressure on shifting of the resonance frequency can be avoided. As pointed out in said copending Arditi (58), Serial No. 716,686, buffer gases having an atomic weight equal to or greater than argon cause a decrease in the resonant frequency with increases in pressure, while those having a lighter atomic weight than argon cause an increase in the resonant frequency with increases in pressure. By suitable combination of these buffer gases, it can be arranged that changes in pressure of the gases will not shift the center or resonant frequency. Thus, in said copending case, Serial No. 716,686, it has been suggested that in a cesium cell a mixture of neon and argon with their partial pressures being 35 percent to 65 percent, respectively, theoretically produce a flat curve. There are, however, a number of other parameters that can only be empirically determined which require a further slight adjustment in the percentages in a given case. Another example cited in the foregoing application is the use in a cesium cell of a mixture of 60 percent helium and 40 percent xenon. In general, it may be stated that to obtain a flat characteristic, the gases are added so that their partial pressures are approximately in inverse proportion to the ratio of their rates of change, with one of the gases having an atomic weight of argon or heavier and another of the gases having an atomic weight less than argon.

Referring now to FIG. 5, the novel atomic clock comprises a plurality of gas cells connected in cascade. In the illustration, the component parts which correspond to those parts described in FIG. 1, bear the same reference numerals. The equivalent parts in the cascaded arrangement, for simplicity, bear the same reference numerals with subcharacters $a$ and $b$ to show they are related. Thus, each section of the cascaded arrangement comprises a source of excitation, gas cell, photocell, amplifier and phase detector. Each of the gas cells is radiated by microwave energy from a horn, and the frequency of the microwave energy is determined by a stabilized oscillator, as in the embodiment described in FIG. 1. Similarly, the phase detectors are coupled to the low frequency oscillator for comparing the phase of the light detected energy and the low frequency oscillations. Each of the horns is supplied with energy over attenuators 16, 17, 18, respectively, for selectively varying the magnitude or level of the power applied to the horn. Preferably, the power levels are selected so that in the illustrated embodiment the bandwidths of the resonance frequency in each of the gas cells is successively reduced in graduated steps. In effect, therefore, the cascaded arrangement corresponds to a plurality of frequency discriminators of variable bandwith connected in parallel, the bandwidth of each cell being controlled by the amount of microwave power irradiating the gas cell. Another and alternate or simultaneous way of controlling the bandwidth of the different cells in FIG. 5 is by controlling the pressure of the buffer gases, as pointed out hereinbefore and indicated by the valves 22 and the source of buffer gases 23 associated with each cell. The buffer gases will be fed to the cells in mixtures, as pointed out hereinbefore so as not to shift the center or resonant frequency of the cells but merely to change the bandwidths of the various cells by successively increasing or decreasing amounts. Of course, instead of controlling the gas pressures by an arrangement as shown, a more convenient method of doing this may be to have the gas cells originally made with different buffer gas pressures. In this case, the control of the microwave power applied to the cells may be employed as a vernier for final adjustments of the bandwidth of the cells if this becomes necessary. To illustrate, the first or broadest bandwidth cell 4 may have a $\Delta f$ of, for example, 1000 cycles requiring an accuracy of the crystal oscillator of only 1 part in one million. This is suggested by the S curve marked G in FIG. 6. The successive cells 4$a$ and 4$b$ have diminishing bandwidths also as suggested by the curves H and I of FIG. 6. The combined S curve of all the cells is indicated by the curve marked J in FIG. 6. The error voltages produced by each cell are fed in parallel to the controlling element of the crystal oscillator frequency. For simplicity, the servo control circuit and potentiometer have been omitted from FIG. 5. Thus, the system provides a detector or discriminator curve of the general form shown as J in FIG. 6. It is observed that the slope of the resultant S curve is relatively steep, thereby reducing significantly the noise $\Delta \epsilon$.

The atomic clock of the invention is thus capable of maintaining a relatively inexpensive crystal oscillator locked to the center frequency $f_0$ of an atomic resonance with great accuracy. For further details of the atomic clock, not here included, reference is made to said copending applications and to the prior art.

While there has been described above the principles of the invention in connection with specific arrangements, it is to be clearly understood that the description is made only by way of example, and not as a limitation to the scope of the invention, as set forth in the objects thereof, and in the accompanying claims.

I claim:

1. An atomic clock comprising a source of oscillations, a plurality of gas cells each having the same atomic resonance center frequency for a given spectral line but differing in the bandwidths of said given lines, means associated with each of said cells for detecting the difference in frequency between the frequency of oscillations from said source and said center frequency for each of said cells and producing a corresponding error signal for each cell and means for applying the error signals to said source to lock the frequency thereof to said center frequency.

2. An atomic clock comprising a source of oscillations, a plurality of gas cells having the same atomic resonance center frequency for a given spectral line, means for broadening the bandwidth of said given line in at least one of said cells with respect to another cell while maintaining said same center frequency, means associated with each of said cells for detecting the difference in frequency between the frequency of the oscillations from said source and said center frequency in each of said cells and producing a corresponding error signal for each cell, and means for applying the error signals to said source to lock the frequency thereof to said center frequency.

3. An atomic clock according to claim 2, wherein said detecting means includes means for irradiating said cells with energy having the frequency of said source, and said broadening means includes means for adjusting the level of said energy as applied to one of said cells to be greater than said energy applied to another of said cells.

4. An atomic clock according to claim 3, wherein said means for applying the greater energy to one of said cells includes means for applying energy of such magnitude as to induce microwave saturation therein thereby increasing the bandwidth of the saturated cell to thereby increase the range within which said cell controls the frequency of said source of oscillations.

5. An atomic clock comprising an oscillator, a plurality of gas cells having the same atomic resonance center frequency for a given spectral line, means for broadening the bandwidth of said line in certain of said cells so that said lines have different bandwidths while maintaining said center frequency, means for deriving from said oscillator oscillations having a frequency approaching that of said center frequency, means associated with each of said cells for detecting the difference in frequency between the frequency of said derived oscillations and said center frequency for each of said cells and producing a corresponding error signal for each cell, and means for applying the error signals to said oscillator to adjust the frequency thereof so that the derived oscillations are locked to said center frequency; said oscillator constituting the frequency determining element of said source of microwave energy; said detecting means including a low frequency oscillator, means for modulating said first-mentioned oscillator with the low frequency oscillations whereby the frequency of the microwave energy is correspondingly varied about said center resonance frequency, said gas cells having a known light absorption characteristic when radiated by energy at said center resonance frequency, and a different light absorption characteristic at frequencies different from said center resonance frequency, means for projecting resonance light into each of said cells, the intensity of light passed by each of said cells being dependent on the instantaneous frequency of the microwave energy, respective means for detecting the intensity of light passing through each of said cells, the detected energy being in the form of a periodically varying wave corresponding in frequency to said low frequency oscillations, and a plurality of phase detectors, each coupled to a different one of said light detecting means for comparing the phases of said low frequency oscillations and the periodically varying waves from the respective light detecting means and for producing error signals dependent on the respective phase differences.

6. The atomic clock according to claim 5, wherein said gas cells and phase detectors are connected in cascade, and the output from said phase detectors are applied in parallel to control the frequency of said oscillator.

7. The atomic clock according to claim 6, wherein the power levels of said microwave energy are in sequentially graduated steps for discretely successively broadening the bandwidth of said given lines in the respective cells, whereby the resultant S curve produced by the combination of the outputs from the respective phase detectors has a slope of substantial steepness.

8. An atomic clock comprising a source of oscillations, a plurality of alkali metal vapor cells having the same atomic resonance center frequency of a given spectral line and each containing a mixture of buffer gases, the pressure of said buffer gases differing in different cells whereby there is a difference in the bandwidths of said given lines in different cells, one of the gases in said mixture having an atomic weight equal to or greater than argon and another having an atomic weight less than argon, the mixture being such that said center frequency remains constant despite the differences in pressure, means associated with each of said cells for detecting the difference in frequency between the frequency of oscillations from said source and said center frequency for each of said cells and producing a corresponding error signal for each cell, and means for applying the error signals to said source to lock the frequency thereof to said center frequency.

9. An atomic clock comprising a source of oscillations, a plurality of gas cells each containing an alkali metal vapor and a mixture of a plurality of gases of different weights taken from the class consisting of hydrogen, helium, nitrogen, neon, argon, krypton, and xenon, said mixture having different pressures in the different cells to provide different bandwidths for corresponding given spectral lines, the gases of the mixture being so chosen that the cells have the same atomic resonance center frequency for said given lines, means associated with each of said cells for detecting the difference in frequency between the frequency of oscillations from said source and said center frequency for each of said cells and producing a corresponding error signal for each cell and means for applying the error signals to said source to lock the frequency thereof to said center frequency.

10. A stable frequency system comprising, in combination, a substance which is capable of producing a microwave induced transition at a predetermined frequency; means for exciting said substance to render it capable of said transition; a frequency generator for producing a wave at said frequency and applying the same to said substance; means for optically detecting the amount of interaction between said applied wave and said substance; and means responsive to the latter quantity for controlling the frequency of said generator.

11. In combination, a frequency generator capable of operation at the atomic resonance frequency of a resonant gas; an atomic resonant gas to which an output of said generator is applied; means for optically detecting transitions in the gas at said atomic resonance frequency; and means responsive to the optically detected signal for maintaining the generator frequency stable.

12. A system for stabilizing a frequency generator at an atomic resonance frequency comprising a cell containing a volume of alkaline metal vapor, means including a source of light directed into said cell for optically exciting said vapor, a frequency generator, means coupled to said generator for radiating electromagnetic energy into said cell, means associated with said cell for optically detecting the transitions therewithin, and automatic frequency control means coupled to said optical detecting means for stabilizing the frequency of said generator.

13. A system for stabilizing a microwave generator at an atomic microwave resonance frequency comprising a cell containing a volume of alkaline metal vapor, means including a source of light directed into said cell for optically exciting said vapor, a microwave generator, means coupled to said generator for radiating microwave energy into said cell, means associated with said cell for optically detecting the microwave transitions therewithin, and automatic frequency control means coupled to said optical detecting means for stabilizing the frequency of said microwave generator.

References Cited in the file of this patent

UNITED STATES PATENTS

| | | |
|---|---|---|
| 2,670,649 | Robinson | Mar. 2, 1954 |
| 2,699,503 | Lyons et al. | Jan. 11, 1955 |
| 2,707,231 | Townes | Apr. 26, 1955 |
| 2,743,366 | Hershberger | Apr. 24, 1956 |
| 2,745,014 | Norton | May 8, 1956 |
| 2,749,443 | Dicke et al. | June 5, 1956 |

Disclaimer 3,174,114.—*Maurice Arditi*, Clifton, N.J. ATOMIC CLOCK. Patent dated Mar. 16, 1965. Disclaimer filed July 15, 1969, by the assignee, *International Telephone and Telegraph Corporation*.

Hereby enters this disclaimer to claim 1 of said patent.

[*Official Gazette November 4, 1969.*]